(12) United States Patent
Vollmer

(10) Patent No.: US 7,859,160 B2
(45) Date of Patent: Dec. 28, 2010

(54) ELECTRIC MACHINE WITH CONCENTRATED WINDINGS

(75) Inventor: Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 187 days.

(21) Appl. No.: 12/064,130

(22) PCT Filed: Jul. 31, 2006

(86) PCT No.: PCT/EP2006/064829

§ 371 (c)(1),
(2), (4) Date: Aug. 18, 2008

(87) PCT Pub. No.: WO2007/020176

PCT Pub. Date: Feb. 22, 2007

(65) Prior Publication Data

US 2009/0218904 A1    Sep. 3, 2009

(30) Foreign Application Priority Data

Aug. 18, 2005 (DE) ........................ 10 2005 039 176

(51) Int. Cl.
H02K 3/28 (2006.01)
H02K 3/46 (2006.01)
H02K 1/14 (2006.01)
H02K 1/16 (2006.01)

(52) U.S. Cl. ................. 310/184; 310/216.069; 310/216.074

(58) Field of Classification Search ............. 310/184, 310/185, 186, 195, 198, 216.069, 216.074, 310/216.092, 216.097, 216.112

See application file for complete search history.

(56) References Cited

U.S. PATENT DOCUMENTS 5,723,931 A * 3/1998 Andrey ................. 310/179

(Continued)

FOREIGN PATENT DOCUMENTS

DE        198 18 432 A1    11/1998

(Continued)

OTHER PUBLICATIONS

Friedrich Jürgen K-H: "Bauformen und Betriebsverhalten modularer Dauermagnetmaschinen", Dissertation von der Fakultät für Elektrotechnik der Universität der Bundeswehr München, XX, XX, 1991, Seiten 1-41, XP002387835, Seite 20—Seite 32: Abbildungen 2.5.2.7.2.8.

(Continued)

Primary Examiner—Tran N Nguyen
(74) Attorney, Agent, or Firm—Henry M. Feiereisen; Ursula B. Day

(57) ABSTRACT

The electrical machine (1) has a stator (2), which has slots (6) distributed about the periphery, between which a tooth (7, 8) is placed, and in which a winding system (9) with at least one winding phase is placed. Each winding phase contains at least one coil group. Each coil group contains a first single coil (10) and at least one additional coil (11). All single coils (10, 11) of each coil group are electrically connected in series. Each of the additional single coils (11) is arranged in an offset manner with an offset angle ($\phi m_{k,i}$) in relation to the first single coil (10). The respective offset angle ($\phi m_{k,i}$) is calculated according to: formula (I) in which k ∈ {1, 2, ... (n−I, i ∈ {0, 1, ... (6−$p_N$−1)}, n being a group coil number of all single coils (10, 11) of the respective coil group, k being a coil index of the additional single coils (11), i being a position index, and $p_N$ being an effective pole number. The teeth (7, 8) at least partially differ from one another in their respective shape or in their respective extension in the peripheral direction.

7 Claims, 5 Drawing Sheets

U.S. PATENT DOCUMENTS

| | | | |
|---|---|---|---|
| 6,127,760 A * | 10/2000 | Nagasaki et al. | 310/216.074 |
| 7,141,905 B2 * | 11/2006 | Vollmer | 310/216.112 |
| 7,352,099 B2 * | 4/2008 | Schunk et al. | 310/216.069 |
| 2004/0095035 A1 * | 5/2004 | Sogabe et al. | 310/216 |
| 2005/0212374 A1 * | 9/2005 | Mitcham | 310/216 |
| 2008/0197742 A1 * | 8/2008 | Vollmer | 310/198 |

FOREIGN PATENT DOCUMENTS

| | | |
|---|---|---|
| DE | 199 05 748 A1 | 8/1999 |
| DE | 198 24 042 A1 | 12/1999 |
| DE | 199 61 760 A1 | 7/2001 |
| DE | 101 14 014 A1 | 10/2002 |
| EP | 1 261 102 A2 | 11/2002 |
| EP | 1 422 806 A2 | 5/2004 |

OTHER PUBLICATIONS

Zhu Z Q et al: "Influence of Design Parameters on Cogging Torque in Permanent Magnet Machines": IEEE Transactions on Energy Conversion, IEEE Service Center, Piscataway, NJ, US, Band 15, Nr. 4, Dec. 2000, XP011015601, ISSN: 0885-8969, Seite 408, Spalte 1, Absatz 1—Seite 412, Spalte 1, Absaatz 2; Abblldungen 4,6; Tabellen 1.2.

* cited by examiner

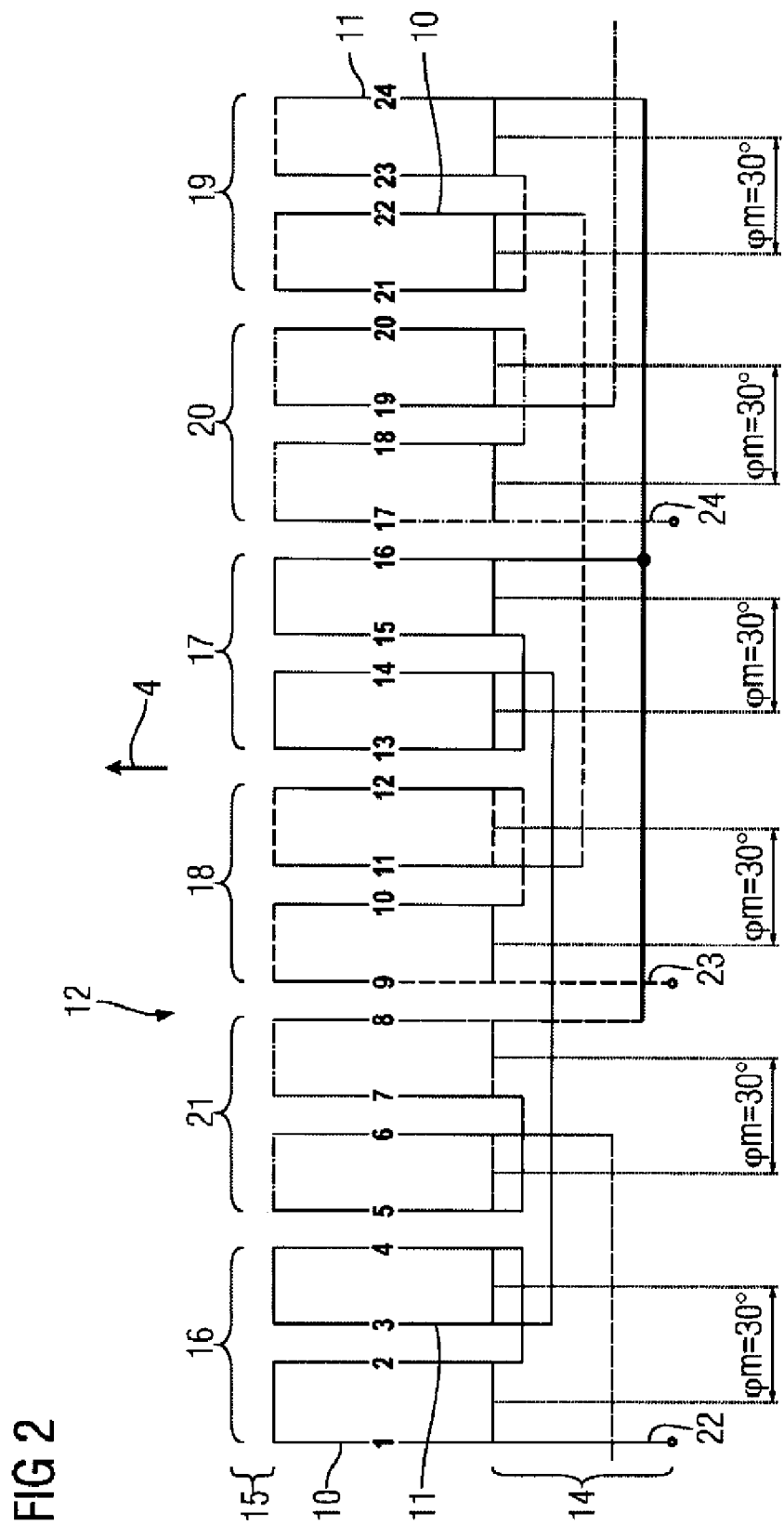

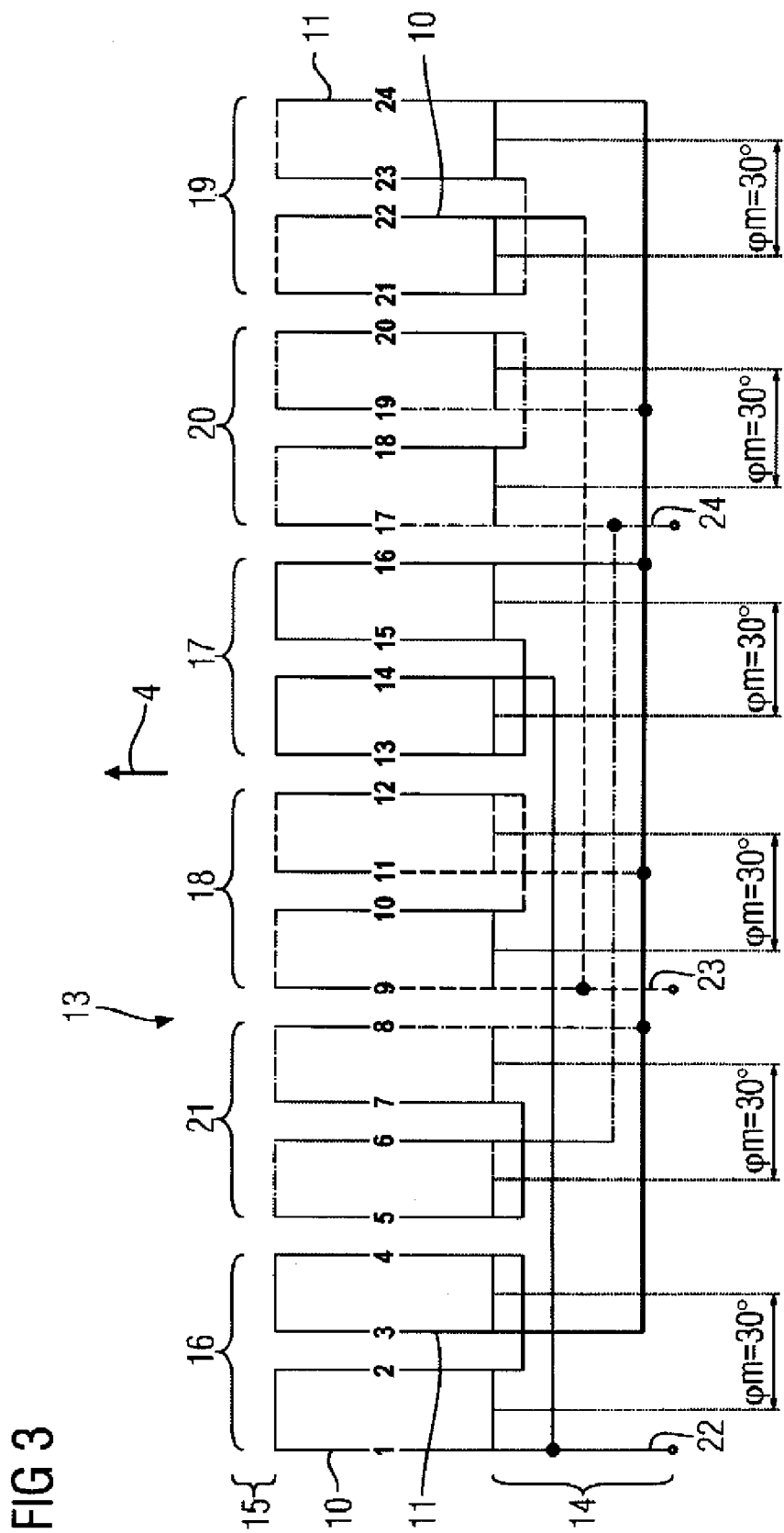

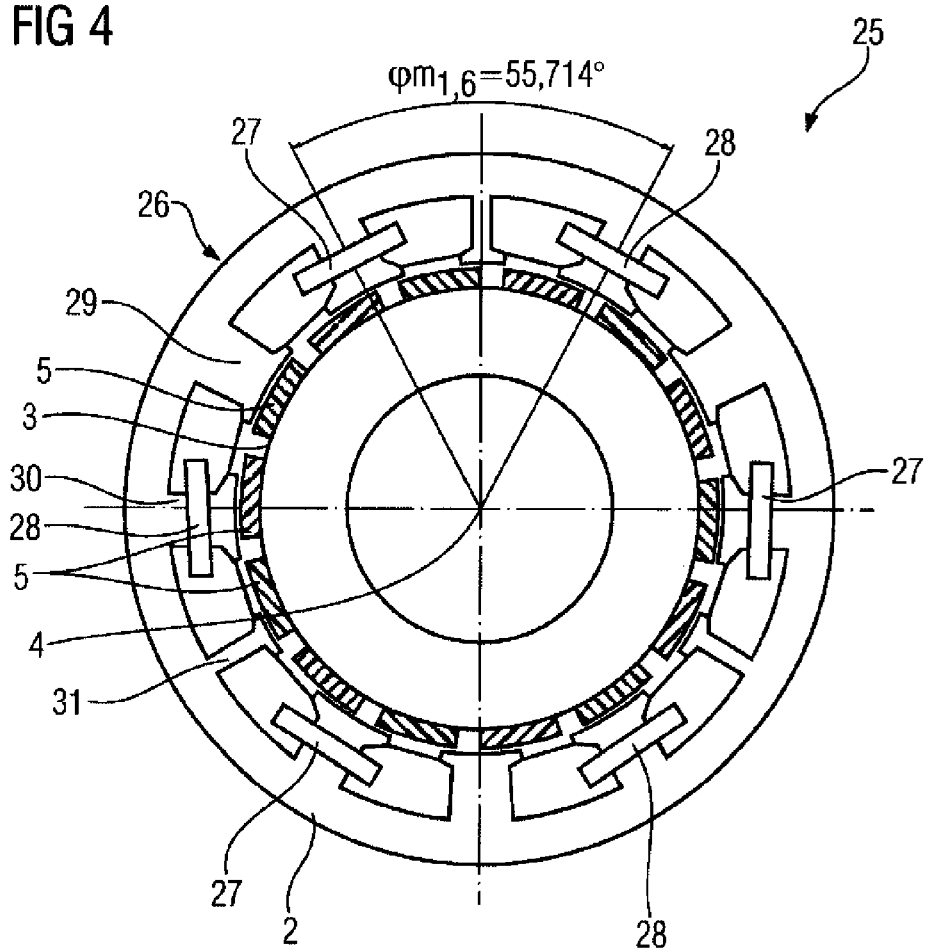
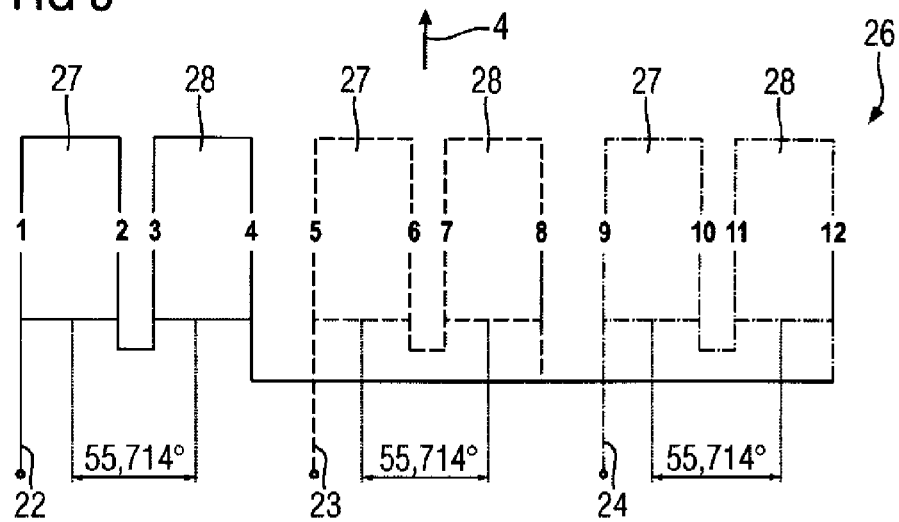

ELECTRIC MACHINE WITH CONCENTRATED WINDINGS

BACKGROUND OF THE INVENTION

The invention relates to an electric machine with a stator having slots distributed about the circumference, with a tooth arranged between each of the slots, with a winding system having at least one winding phase, wherein each winding phase includes at least one coil group, and each coil group includes at least one first single coil and at least one additional single coil, and all single coils of each coil group are electrically connected in series.

An electric machine of this type, in particular an electric machine implemented as a three-strand permanent-excited synchronous machine, exhibits in operation some torque ripple. Several remedies are known for reducing this torque ripple.

For example, DE 199 61 760 A1 discloses that special winding factors of the winding system arranged in the slots of the stator and having the slots at an angle reduce the torque ripple.

DE 101 14 014 A1 also discloses a permanent-excited three-phase machine with a stator having angled slots receiving the winding system. The special design of the stator and the winding system substantially suppress cogging and the fifth harmonic.

In spite of these conventionally applied measures, there is a need for a further reduction of torque ripple. This is of particular importance if the electric machine is to be manufactured inexpensively.

SUMMARY OF THE INVENTION

It is therefore an object of the invention to provide an electric machine of the afore-described type which has an improved torque characteristic and the lowest possible torque ripple.

The object is attained according to the invention by an electric machine that, in iwhich each of the additional single coils is arranged with an offset angle, as measured in a circumferential direction of the stator, relative to the first single coil, wherein the respective offset angle is provided according to:

$$\varphi m_{ki} = \left(i + \frac{k}{n}\right) \cdot \frac{60°}{p_N} \text{ with } \begin{array}{l} k \in \{1, 2, \ldots (n-1)\} \\ i \in \{0, 1, \ldots (6 \cdot p_N - 1)\} \end{array}$$

wherein n is a group coil number of all single coils of the respective coil group, k is a coil index of the additional single coils, i is a position index, and $p_N$ a number of effective pole pairs, and the teeth are at least partially different from one another in the circumferential direction with respect to their shape or their dimension.

In the context of the invention, it has been recognized that one of the causes of the torque ripple is a variation of the magnetic flux caused by saturation effects. Depending on the actual three-phase current applied to the winding system of the stator, spatially limited regions can form in the stator, where the magnetic material of the stator laminate temporarily reaches saturation. The location of these saturation regions also changes in the stator depending on the temporal changes of the applied three-phase current.

In particular in the simplest embodiment of a three-phase synchronous machine, which includes two poles and a three-strand winding system arranged in a total of six stator slots, it can be shown that each constellation of the applied three-phase current occurs six times along the circumference. The aforementioned saturation effects therefore cause a torque ripple with the sixth harmonic. The effect of these saturation effects can be addressed by assigning additional virtual teeth (or slots) to the stator. In the afore-described two-pole three-phase synchronous machine, two additional virtual teeth would have to be provided which are then arranged equidistantly about the circumference of the stator.

According to the invention, the effect of these virtual teeth can be suppressed by mutually compensating the rotating regions showing local saturation. This is achieved with the advantageous winding system according to the invention. The single coils of a coil group, which are electrically connected in series, are offset in the circumferential direction in such a way that the individual magnetic fields produced by the single coils are compensated at the sixth harmonic of the effective pole number.

The computation rule according to the invention provides these particularly beneficial mechanical offset angles for each of the additional single coils as a relative angle with respect to the angular position of the first single coil. The angular values are here referenced to a coil center which can be associated with each of the single coils.

The individual magnetic fields of the single coils arranged in this manner cancel each other at the sixth harmonic and thereby compensate the negative effect on the torque caused by the virtual teeth, resulting in altogether significantly improved torque characteristics with reduced ripple.

Advantageous embodiments of the electric machine according to the invention are recited in the claims which depend from claim 1.

One variant is advantageous where the single coils are implemented as tooth coils, with each tooth coil surrounding a tooth located between adjacent slots. Tooth coils significantly simplify the manufacture of the electric machine.

Preferably, the electric machine is a permanent-excited machine with a rotor equipped with permanent magnets. Permanent-excited machines, in particular permanent-excited synchronous machines, such as synchronous motors, are nowadays mass produced and have a small size. The preferred space-saving tooth coils take this into account. The additionally attained small torque ripple offers a cost advantage which is particularly relevant for mass-produced articles.

Advantageously, the coil groups associated with the at least one winding phase are electrically connected in series. This is advantageous for electric machines designed for a low rotation speed.

In another embodiment, the coil groups associated with the at least one winding phase are electrically connected in parallel. This is advantageous for electric machines designed for a high rotation speed.

Advantageous is also a variant where the rotor is implemented as an external rotor or an internal rotor. The afore-described advantageous winding system can be employed with both embodiments while retaining the aforementioned advantages.

BRIEF DESCRIPTION OF THE DRAWING

Additional features, advantages and details of the invention are described in the following exemplary embodiments with reference to the drawing. It is shown in.

DETAILED DESCRIPTION OF PREFERRED EMBODIMENTS

Mutually corresponding elements in FIGS. 1 to 7 are indicated with the same reference symbols.

Figure 1:
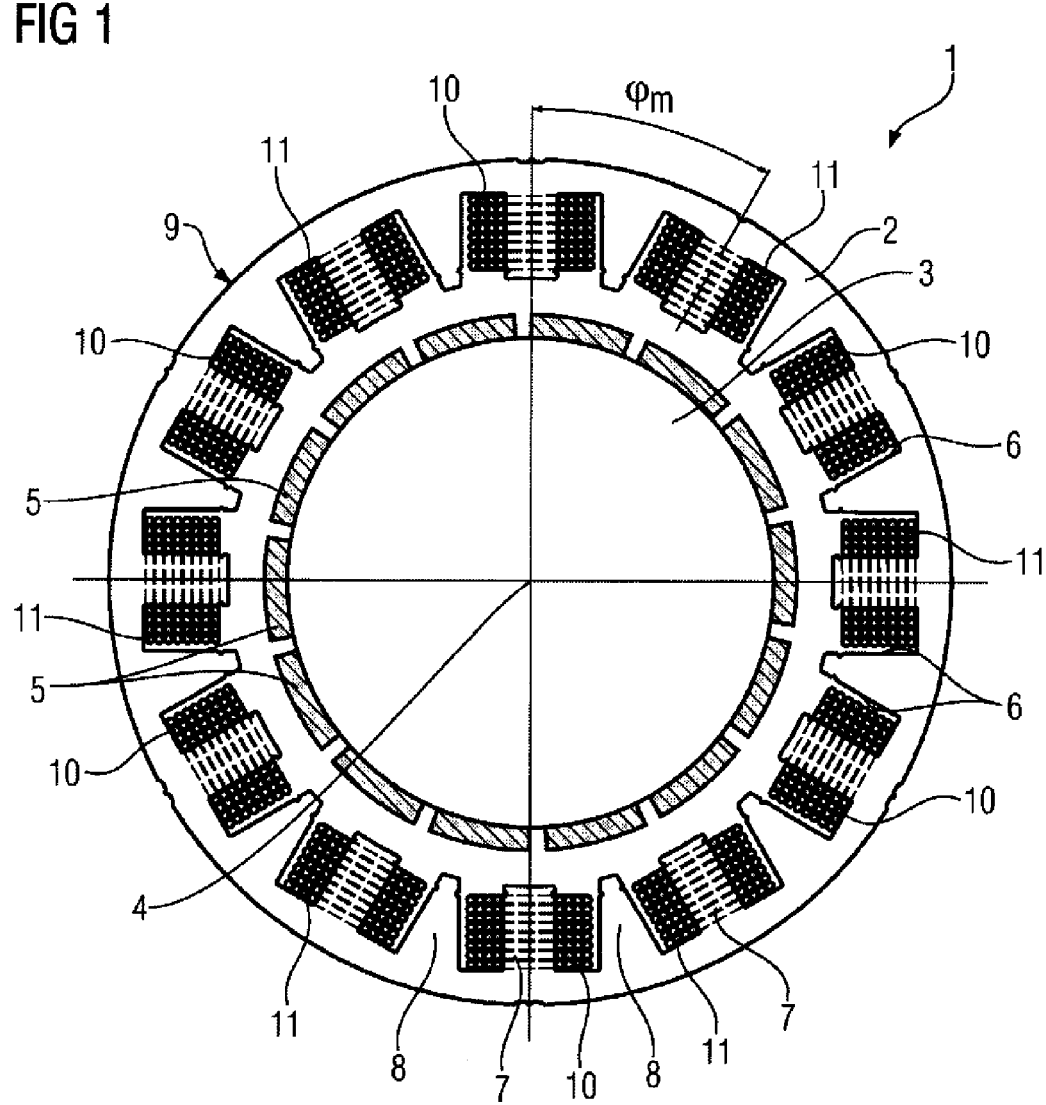
FIG. 1 a cross-sectional diagram of a first exemplary embodiment of an electric machine with single coils arranged with an angular offset, FIG. 2 a first exemplary embodiment for a winding diagram of the electric machine of FIG. 1, FIG. 3 a second exemplary embodiment for a winding diagram of the electric machine of FIG. 1, FIG. 4 a cross-sectional diagram of a second exemplary embodiment of an electric machine with single coils arranged with an angular offset, FIG. 5 an exemplary embodiment for a winding diagram of the electric machine of FIG. 4, FIG. 6 a cross-sectional diagram of a third exemplary embodiment of an electric machine with single coils arranged with an angular offset, and FIG. 7 an exemplary embodiment for a winding diagram of the electric machine of FIG. 6.

FIG. 1 shows an exemplary embodiment of an electric machine 1 in a cross-sectional view. The machine is configured as a permanent-excited synchronous motor and includes a stator 2 and a rotor 3 which is rotatably supported for rotation about a rotation axis 4. The rotor is an internal rotor which in the exemplary embodiment is provided with a total of fourteen permanent magnets 5, resulting in $p_L=7$ rotor pole pairs. The number of rotor pole pairs $p_L$ is here equal to the number of effective rotor pairs $p_N$. The stator 2 has on its inner walls facing the rotor 3 several, in the exemplary embodiment of FIG. 1 a total of twenty-four, slots 6 which are uniformly distributed about the circumference. A tooth 7 with parallel sides or a tooth 8 with non-parallel sides is arranged between the slots 6. The teeth 7 and 8 thus have a different shape. They alternate in the circumferential direction. They are connected with one another by a peripheral outer yoke. Electric conductors of a three-strand winding system 9 run inside the slots 6. The winding system 9 is implemented with tooth coils 10 and 11.

Each of the tooth coils 10 and 11 surrounds one of the teeth 7 having parallel sides. The two adjacent slots 6 and the surrounded tooth 7 each have parallel side walls, so that the prefabricated tooth coil 10 or 11 can be easily inserted in the laminate of stator 2. This significantly simplifies the manufacture of the electric machine 1. In addition, a high slot fill factor can be attained, and the electric machine 1 can be realized in very compact form and by using very little material.

The tooth coils 10 and 11 are formed as a single layer. The electric conductors of the respective tooth coil windings are placed essentially entirely in the slots 6 and fill the slots 6.

Details of the winding system 9 are illustrated in the two simplified winding diagrams shown in FIGS. 2 and 3. Two exemplary embodiments of a winding system 12 and 13, respectively, are illustrated, which are essentially designed according to the same principle, but are connected differently in the region of a winding head 14. As indicated in FIGS. 2 and 3, a corresponding region for a winding head 14 and 15 is provided in the axial direction, i.e., in the direction of the rotation axis 4 on both end faces of the actually active part of the stator 2. Whereas the electric conductors of the tooth coil windings are only bent around in the region of the winding head 15, the tooth coils 10 and 11 are in addition electrically connected in the region of the winding head 14.

In both exemplary embodiments, the tooth coils 10 and 11 forming single coils are combined into a total of six coil groups 16 to 21, with each of two of these coil groups being associated with one of three winding phases 22 to 24. In the exemplary embodiments, the two tooth coils 10 and 11 which are combined into one of the coil groups 16 to 21 are arranged next to one another in the circumferential direction, with a mechanical mutual offset angle φm of 30° therebetween. They are also electrically connected in series, wherein the tooth coils 10 and 11 have an opposite winding sense.

In the winding system 12 according to FIG. 2, the coil groups 16 and 17 associated with one of the winding phases 22 to 24 are electrically connected in series, while they are connected in parallel in the winding system 13 of FIG. 3. The first winding phase 22 is indicated with a solid line, the second winding phase 23 with a dotted line, and the third winding phase 24 with a dot and dash line.

With the sequential numbering of the slots 6 additionally indicated in FIGS. 2 and 3, the following design of the winding system 12 and 13, respectively, is obtained:

The first winding phase 22 includes the first coil group 16 with two tooth coils 10 and 11, whose wires run in the first and second, and in the third and fourth slot 6, respectively, and the second coil group 17 with two tooth coils 10 and 11, whose wires run in the thirteenth and fourteenth, and in the fifteenth and sixteenth slot 6, respectively.

The second winding phase 23 includes the third coil group 18 with two tooth coils 10 and 11, whose wires run in the ninth and tenth, and in the eleventh and twelfth slot 6, respectively, and the forth coil group 19 with two tooth coils 10 and 11, whose wires run in the twenty-first and twenty-second, and in the twenty-third and twenty-fourth slot 6, respectively.

The third winding phase 24 includes the fifth coil group 20 with two tooth coils 10 and 11, whose wires run in the seventeenth and eighteenth, and in the nineteenth and twentieth slot 6, respectively, and the sixth coil group 21 with two tooth coils 10 and 11, whose wires run in the fifth and sixth, and in the seventh and eighth slot 6, respectively.

Each of the winding phases 22 to 24 includes pairs of tooth coils 10 and 11 which are arranged with a mutual offset of half a revolution. In the winding phase 22, these are, for example, the two tooth coils 10 and 11, whose wires run in the first and second, and in the thirteenth and fourteenth slot 6, respectively. The two tooth coils 10 and 11 of such pairs are each wound with an opposite winding sense in order to prevent mutual compensation of the individual magnetic fields produced by the two tooth coils 10 and 11 at the effective pole pair number $p_N$.

The operation of the electric machine 1 and, above all, of the particularly advantageous winding systems 12 and 13 will now be described.

During operation, the electric machine 1 can have an undesirable torque ripple which can have many origins.

On one hand, reluctance forces between the permanent magnets 5 and the teeth 7 and 8, respectively, cause cogging with a number of cogging pole pairs $p_R$. The latter is determined by the effective number of pole pairs $p_N$ and the number N of slots 6 in the stator 2. In the exemplary embodiment, $p_N$ has a value of seven and N a value of twenty-four. The number of cogging pole pairs $p_R$ then assumes a very high a value of 168, so that the associated field component is strongly attenuated and cogging can be practically eliminated as a cause for torque ripple.

In addition to cogging, other causes for undesirable torque ripple exist. These are time-dependent and spatially variable saturation effects in this stator 2 of limited spatial extent, which depend on the applied current in the winding system 9, 12, and 13, respectively, and can co-rotate in the circumferential direction. These situation effects cause variations of the magnetic flux and result in torque ripple at the sixth harmonic of the effective pole pair number $p_N$. The effect of the situation can be described by fictitiously introducing additional virtual teeth in the stator 2.

The special winding systems 12 and 13 suppress the formation of saturation regions and hence almost entirely of the virtual teeth, resulting in very small torque ripple.

The tooth coils 10 and 11 each produce an individual magnetic field. Due to the offset in the circumferential direction, the individual magnetic fields of the tooth coils 10 and 11 associated with one of the coil groups 16 to 21 produce an electrical offset angle $\phi_e$. For the sixth harmonic of the effective pole pair number $p_N$ responsible for the effect of the virtual teeth, the latter is equal to an odd-numbered multiple of 180°, so that these individual magnetic fields cancel each other for the sixth harmonic.

The condition to be satisfied with the sixth harmonic is therefore:

$$\phi e = \phi m \cdot 6 \cdot p_N = (2 \cdot j - 1) \cdot 180° \text{ with } j \in \{1, 2, 3, \ldots\} \quad (1)$$

The condition is met in the exemplary embodiment with $p_N=7$ and $\phi m=30°$.

With the advantageous design of the winding systems 12 and 13, the detrimental effect of the virtual teeth on the torque ripple of the electric machine 1 is eliminated. This is the result of the favorable spatial arrangement of the tooth coils 10 and 11 of each of the coil groups 16 to 21.

The mechanical offset angle of $\phi m=30°$ between the tooth coils 10 and 11 is the result of a general computation rule, by which the relative arrangement of serially connected single coils of a coil group can be determined such that the effect of the virtual teeth at the sixth harmonic of the effective pole pair number $p_N$ is already compensated within the coil group. This computation rule can be expressed as:

$$\varphi m_{ki} = \left(i + \frac{k}{n}\right) \cdot \frac{360°}{6 \cdot p_N} \quad (2)$$

$$= \left(i + \frac{k}{n}\right) \cdot \frac{60°}{p_N} \text{ with } \begin{array}{l} k \in \{1, 2, \ldots (n-1)\} \\ i \in \{0, 1, \ldots (6 \cdot p_N - 1)\} \end{array}$$

wherein $\phi m$ is a mechanical offset angle, measured in the circumferential direction, of the additional single coils with respect to the first single coil of the coil group, n is a group coil number of all single coils of the coil group, k is a coil index of the additional single coils, an i a position index.

The first summand of equation (2) indicates the periodicity of the pendulum poles caused by the virtual teeth. The factor ($360°/6p_N$) indicates this periodicity, i.e., twice the pole pitch of these pendulum poles. The solutions repeat after a complete revolution, so that the position index i assumes a maximum value of ($6p_N-1$).

The second summand of equation (2) indicates for each of the (n−1) additional single coils, by which fraction of twice the pole pitch of the pendulum poles produced by the virtual teeth the additional single coils are to be offset with respect to the first single coil representing the reference point. All angular offsets computed with the second summand are uniformly distributed within twice the pole pitch of the pendulum poles. This results in the advantageous mutual compensation of the individual magnetic fields which are produced by the effect from the virtual teeth for each of the single coils of the coil group at the sixth harmonic of the number of effective pole pairs $p_N$.

In the exemplary embodiments of FIGS. 1 to 3, two corresponding single coils are provided for each coil group 16 to 21, wherein the tooth coil 10 is the first single coil representing a reference and the tooth coil 11 is the only additional single coil. The group coil number n is therefore two, and the coil index k can only assume the value one. With a number of effective poles $p_N$ of seven, the following theoretically possible offset angles $\phi m$ can be derived from equation (2), wherein of the possible forty-two variants only the first twenty are listed in the following table.

| i | 0 | 1 | 2 | 3 | 4 | 5 | 6 |
|---|---|---|---|---|---|---|---|
| $\phi m_{1,i}$ in ° | 4,286 | 12,857 | 21,429 | 30 | 38,571 | 47,143 | 55,714 |
| i | 7 | 8 | 9 | 10 | 11 | 12 | 13 |
| $\phi m_{1,i}$ in ° | 64,286 | 72,857 | 81,429 | 90 | 98,571 | 107,143 | 115,714 |
| i | 14 | 15 | 16 | 17 | 18 | 19 | |
| $\phi m_{1,i}$ in ° | 124,286 | 132,857 | 141,429 | 150 | 158,571 | 167,143 | |

The exemplary embodiments of FIGS. 1 to 3 are each implemented for the position index i=3, i.e., for $\phi m=30°$. All other listed values are equally applicable for compensating the virtual teeth. However, some may be less advantageous due to other design criteria With equation (2) other electric machines can be designed that compensate the effect of the virtual teeth. Other exemplary embodiments will now be described.

FIGS. 4 and 5 illustrate an exemplary embodiment of another electric machine 25 implemented as a permanent-excited synchronous motor. The rotor 3 has here also fourteen permanent magnets 5, resulting in a number of rotor pole pairs $p_L$ and a corresponding number of effective pole pairs $p_N$ of the seven. The stator 2 receives a three-strand winding system 26, each having two serially connected tooth coils 27 and 28 for each winding phase 22 to 24. The tooth coils 27 and 28 of each of the winding phases 22 to 24 hence form a coil group. The group coil number n is then two, and the coil index can only have the value one.

From equation (2), the same theoretically possible offset angles $\phi m_{1,i}$ are obtained that were listed in the above table for the exemplary embodiments of FIGS. 1 to 3. However, in the winding system 26 of the electric machine 25 another offset angle $\phi m_{1,i}$ is used, namely the angle for the position index i=6. The tooth coils 27 and 28 of each of the winding phases 22 to 24 are therefore offset with respect to one another in the circumferential direction by a mechanical offset angle $\phi m_{1,6}=55.714°$. According to equation (1), this results at the sixth harmonic of the effective number of pole pairs $p_N$ in an electrical offset angle $\phi e$ between the tooth coils 27 and 28 of:

$$\phi e = \phi m_{1,6} \cdot 6 \cdot p_N = 55,714° \cdot 6 \cdot 7 = 2340° = 13 \cdot 180°.$$

The compensation condition is therefore satisfied.

The employed offset angle $\phi m_{1,6}=55.714°$ results in a favorable design solution for the lamination piece of the stator 2 with three types of teeth 29, 30 and 31, which each have a different dimension in the circumferential direction. The teeth 29 to 31 also do not have an equidistant circumferential spacing from the respective adjacent tooth 29 to 31. The circumferential spacing between adjacent slots is not uniform. The circumferential spacing is measured between the radially extending center lines of two adjacent teeth 29 to 31 or slots.

Figure 6:
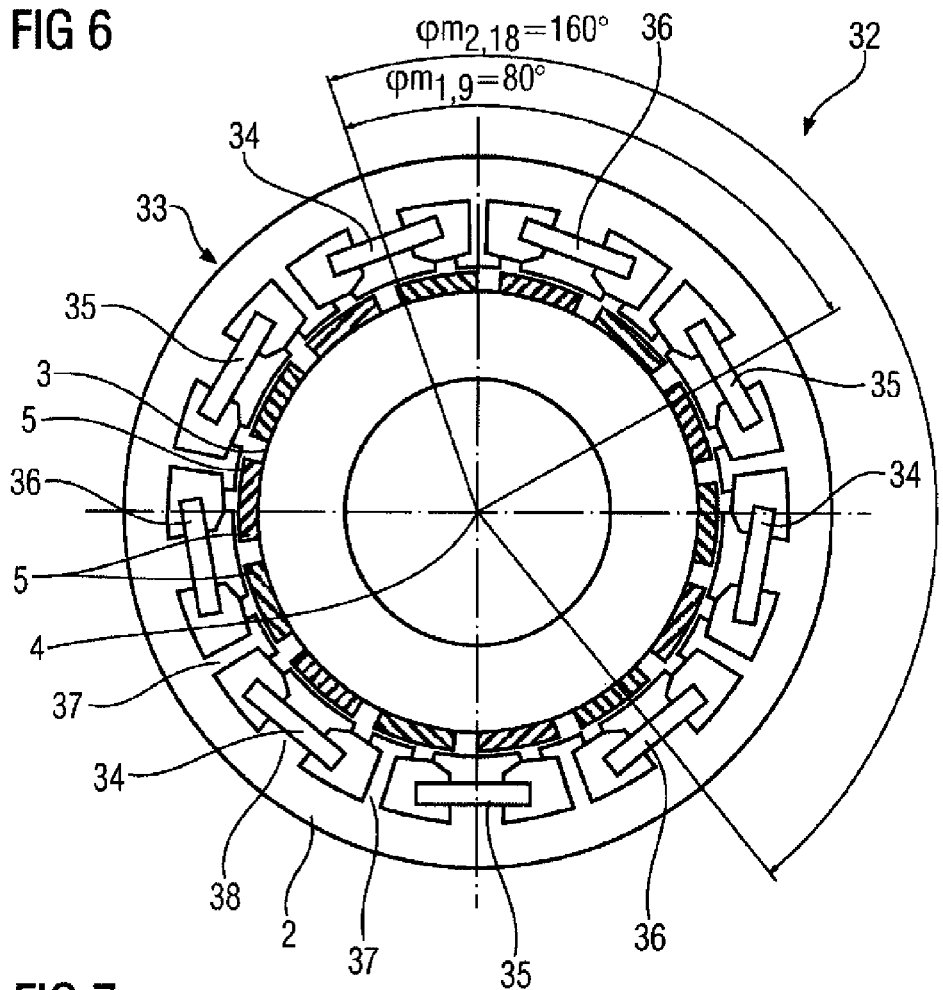
Figure 7:
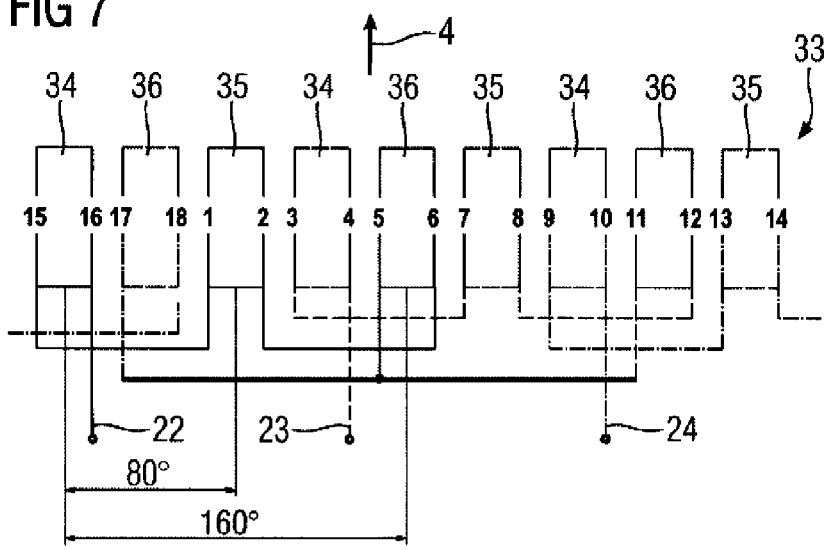

FIGS. 6 and 7 show an exemplary embodiment of another electric machine 32 implemented as a permanent-excited synchronous motor. The rotor 3 has fourteen permanent magnets 5, so that the number of effective pole pairs $p_N$ is again seven. The stator 2 has a three-strand winding system 33, each having three serially connected tooth coils 34, 35 and 36 for each winding phase 22 to 24. The tooth coils 34 to 36 of each of the winding phases 22 to 24 hence again form a coil group. The group coil number n is three, and the coil index can have the value of one or two.

From equation (2), the following theoretically possible offset angles $\phi m_{1,i}$ for the tooth coil 35 and $\phi m_{2,i}$ the tooth coil 36 are obtained, wherein the offset angles $\phi m_{1,i}$ and $\phi m_{2,i}$ are each measured relative to the position of the tooth coil 34. Again, of the possible forty-two variants only the first twenty are listed in the following table:

| i | 0 | 1 | 2 | 3 | 4 | 5 | 6 |
|---|---|---|---|---|---|---|---|
| $\phi m_{1,i}$ in ° | 2,857 | 11,429 | 20 | 28,571 | 37,143 | 45,714 | 54,286 |
| $\phi m_{2,i}$ in ° | 5,714 | 14,286 | 22,857 | 31,429 | 40 | 48,571 | 57,143 |

| i | 7 | 8 | 9 | 10 | 11 | 12 | 13 |
|---|---|---|---|---|---|---|---|
| $\phi m_{1,i}$ in ° | 62,857 | 71,429 | 80 | 88,571 | 97,143 | 105,714 | 114,286 |
| $\phi m_{2,i}$ in ° | 65,714 | 74,286 | 82,857 | 91,429 | 100 | 108,571 | 117,143 |

| i | 14 | 15 | 16 | 17 | 18 | 19 |
|---|---|---|---|---|---|---|
| $\phi m_{1,i}$ in ° | 122,857 | 131,429 | 140 | 148,571 | 157,143 | 165,714 |
| $\phi m_{2,i}$ in ° | 125,714 | 134,286 | 142,857 | 151,429 | 160 | 168,571 |

In the winding systems 33 of the electric machine 32, from a large number of theoretically possible offset angles $\phi m_{1,i}$ and $\phi m_{2,i}$ the angles for the position indexes i=9 and 18 are used. The tooth coil 35 is then arranged relative to the first tooth coil 34 with an offset angle of $\phi m_{1,9}=80°$ and the tooth coil 36 with an offset angle of $\phi m_{2,18}=160°$ in the circumferential direction.

The sequential order of the tooth coils 34 to 36 is not important for compensating the effect from the virtual teeth, as long as the offset conditions for the angles according to equation (2) are satisfied. The same applies to the winding sense. It is unimportant for compensating the effect from the virtual teeth if the tooth coils 34 to 36 are wound with the same winding sense or with an alternating winding sense. The sequential order and the winding sense of the tooth coils 34 to 36 are design criteria which can be determined based on other factors.

This exemplary embodiment has two types of teeth 37 and 38. Each of the teeth 37 is surrounded by one of the tooth coils 34 to 36, wherein each of the teeth 38 is arranged between two adjacent ones of the tooth coils 34 to 36. The teeth 37 and 38 alternate in the circumferential direction. They have different dimensions in the circumferential direction, wherein the dimensions are measured either as an angle in degrees or in radians.

The selected offset angles $\phi m_{1,9}=80°$ and $\phi m_{2,18}=160°$ once more provide an easily implementable solution.

What is claimed is:

1. An electric machine comprising:
   a rotor,
   a stator having a circumference, with a predetermined plurality of slots and a predetermined plurality of teeth distributed about the circumference in alternating arrangement, wherein a shape or dimension of the teeth of at least a subset of the predetermined plurality of teeth is different from a shape or dimension of other teeth that do not belong to the subset, and
   a winding system having at least one winding phase arranged in the slots, wherein each winding phase comprises at least one coil group, and each coil group comprises a first single coil and at least one additional single coil, with the first single coil and the at least one additional single coil of each coil group surrounding a tooth of the subset and being electrically connected in series, and with the other teeth that do not belong to the subset lacking coils,
   wherein each of the at least one additional single coil of a coil group is arranged relative to a corresponding first single coil with a mechanical offset angle of:

$$\varphi m_{ki} = \left(i + \frac{k}{n}\right) \cdot \frac{60°}{p_N} \text{ with } \begin{array}{l} k \in \{1, 2, \ldots (n-1)\} \\ i \in \{0, 1, \ldots (6 \cdot p_N - 1)\} \end{array}$$

as measured in a circumferential direction of the stator,
   wherein n is an index common to a all single coils of a coil group, k is a coil index of the at least one additional single coil, i is a running integer indicating a position of a coil about the circumference of the stator, and $p_N$ a number of pole pairs of the rotor.

2. The electric machine of claim 1, wherein the first single coil and the at least one additional single coil are formed as tooth coils.

3. The electric machine of claim 1, wherein the rotor comprises permanent magnets.

4. The electric machine of claim 1, wherein each winding phase comprises at least two coil groups and the at least two coil groups associated with a winding phase are electrically connected in series.

5. The electric machine of claim 1, wherein each winding phase comprises at least two coil groups and the at least two coil groups associated with a winding phase are electrically connected in parallel.

6. The electric machine of claim 3, wherein the rotor is implemented as an external rotor.

7. The electric machine of claim 3, wherein the rotor is implemented as an internal rotor.

* * * * *